Aug. 22, 1933.　　C. S. BRAGG ET AL　　1,923,186
BRAKE SYSTEM FOR AUTOMOTIVE VEHICLES
Filed June 6, 1928　　6 Sheets-Sheet 3
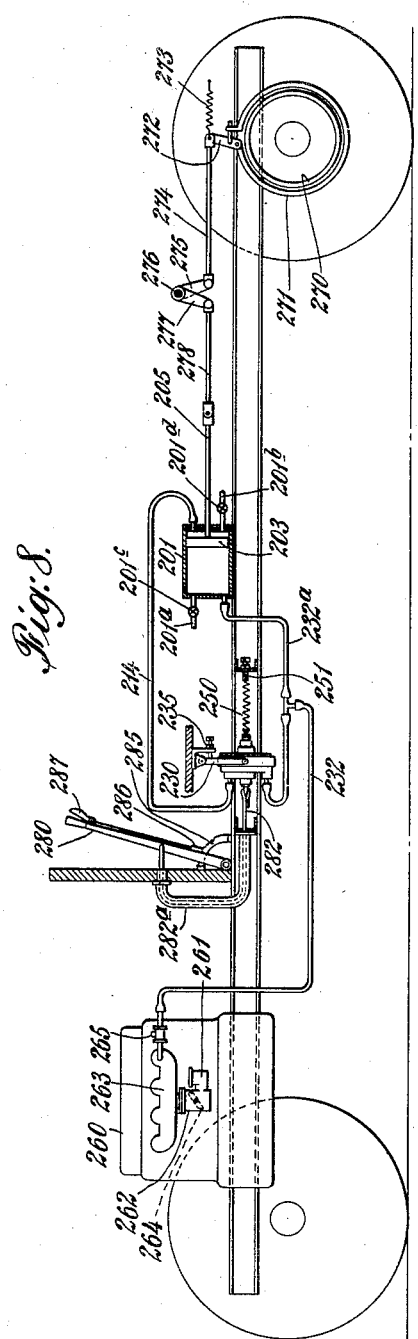
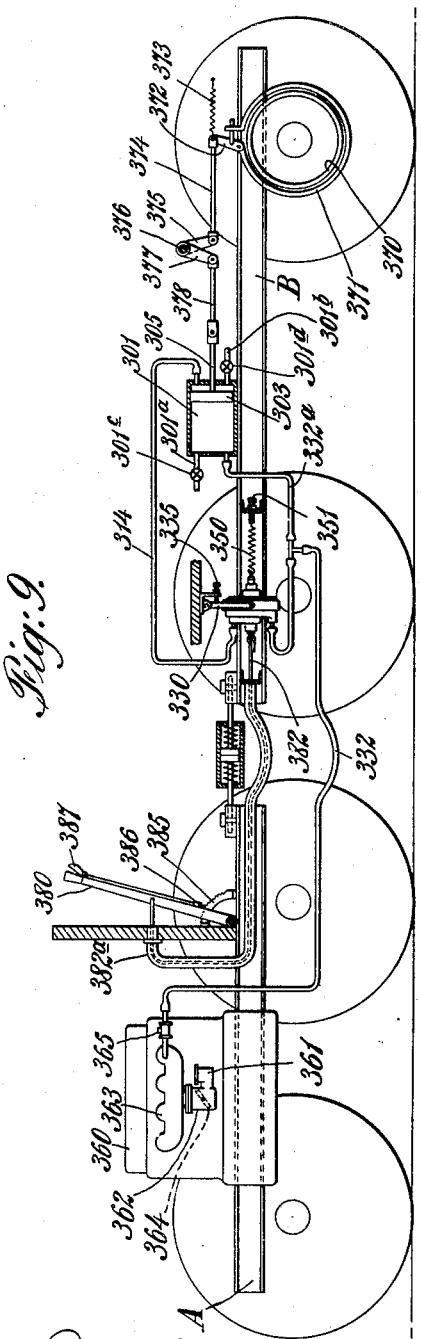
Caleb S. Bragg
Victor W. Kliesrath INVENTORS
BY
Louis Tresooh Whitaker
ATTORNEY

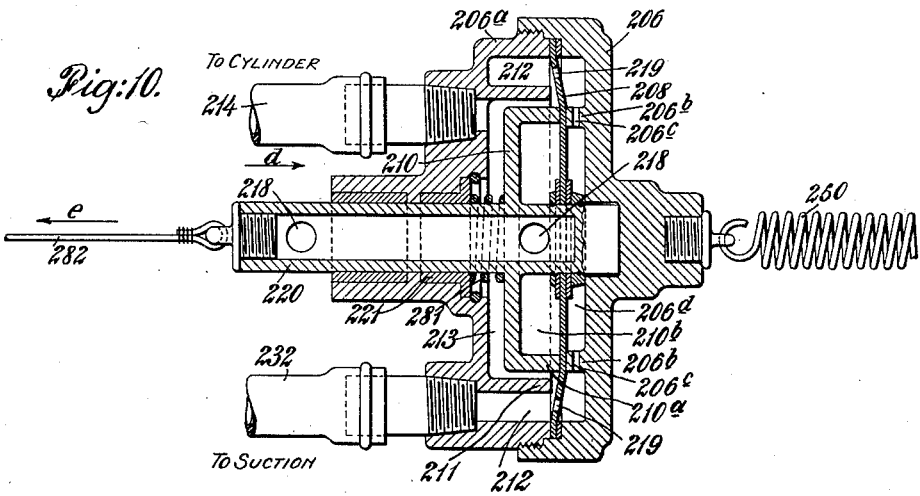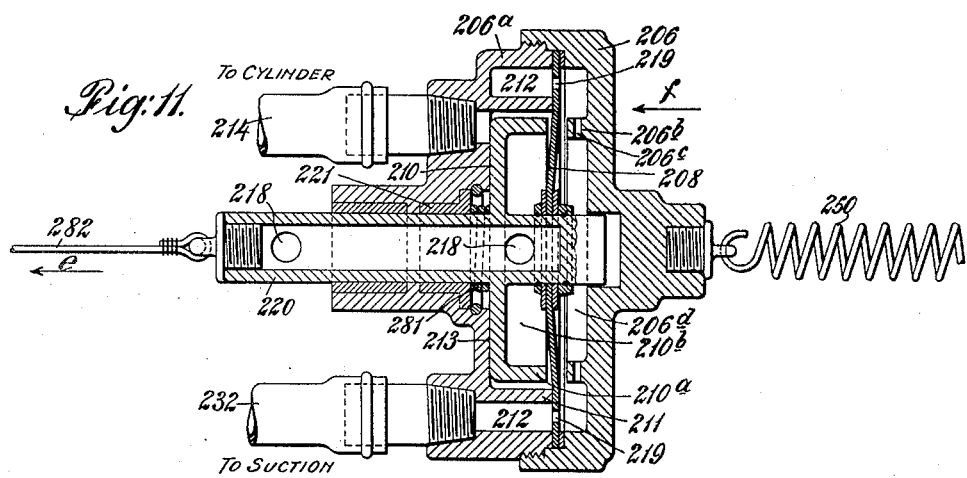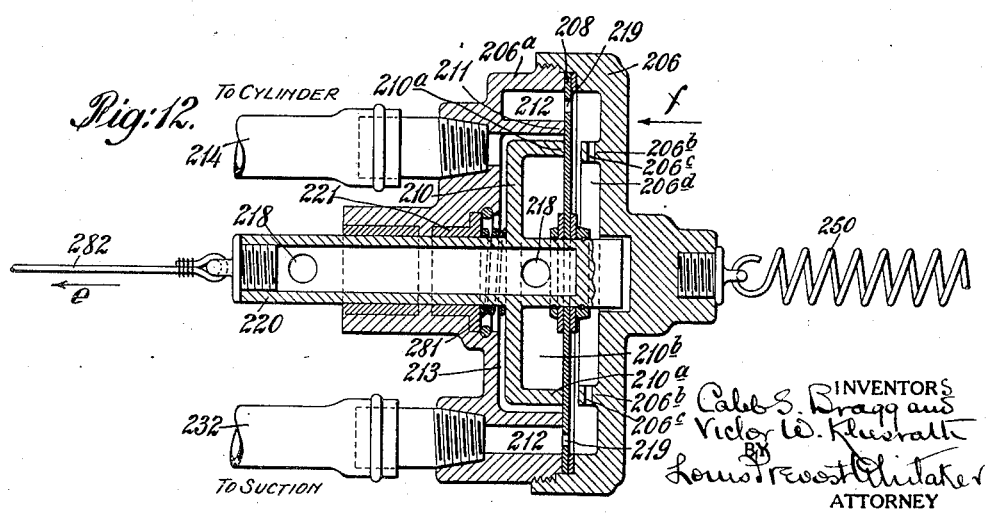

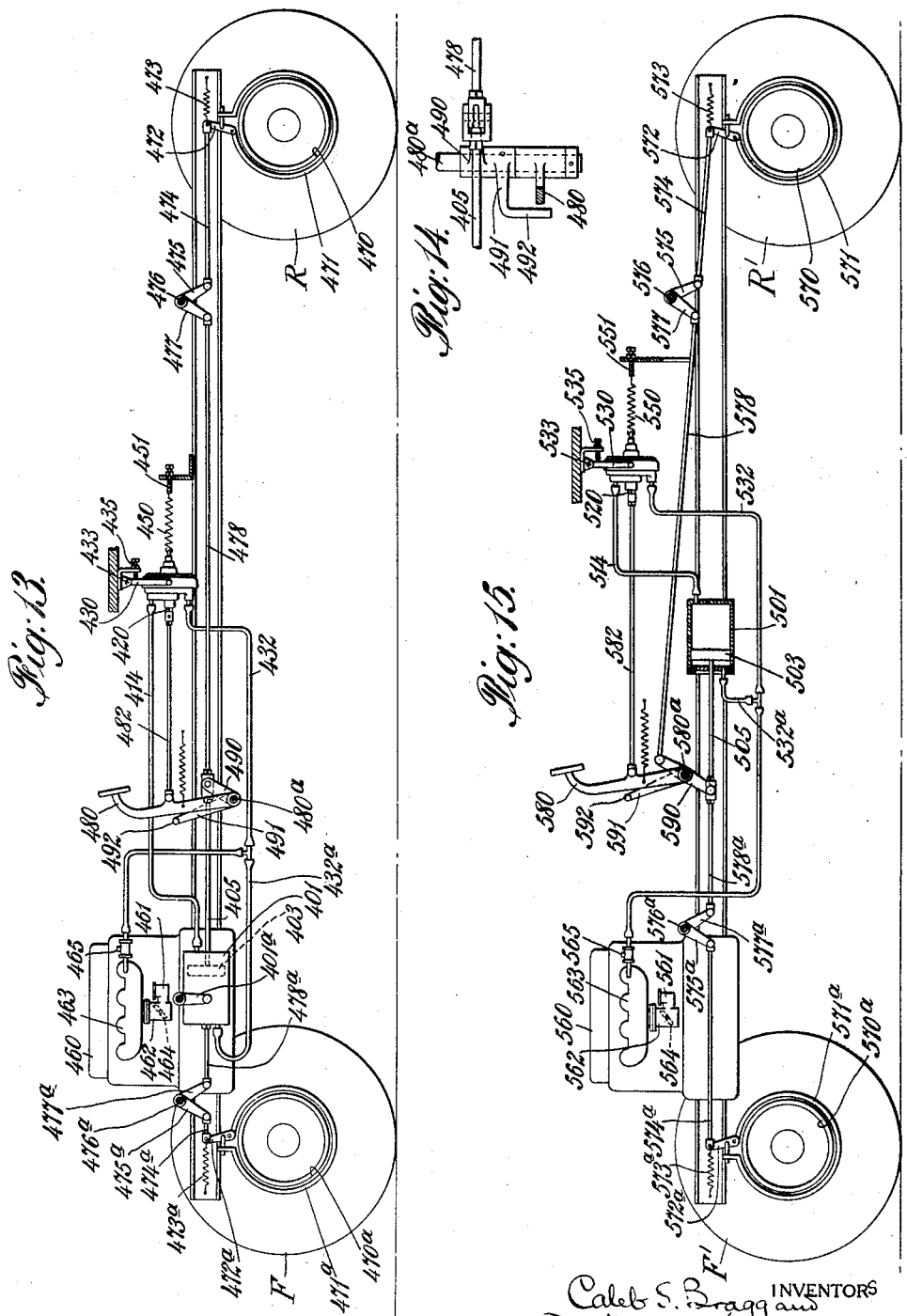

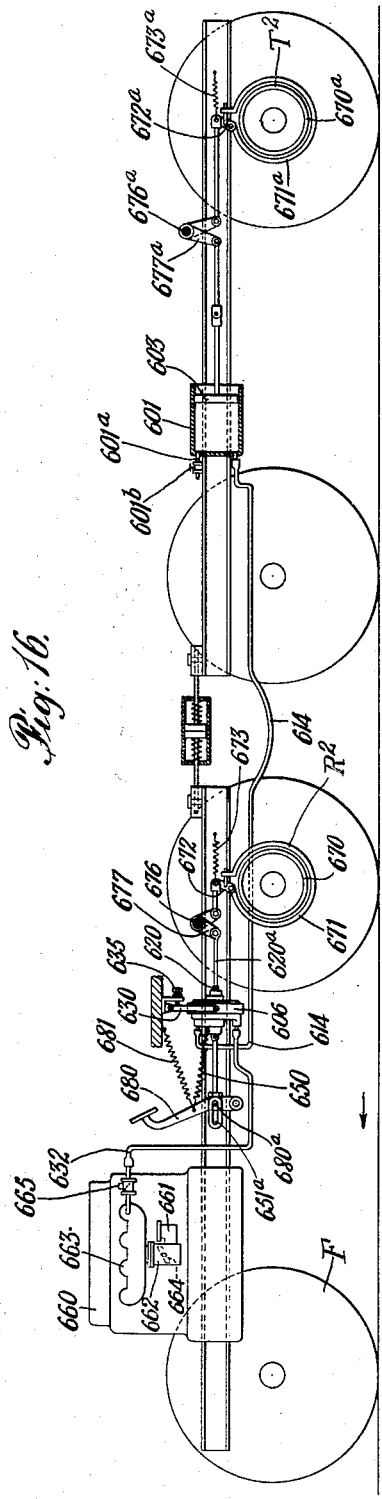
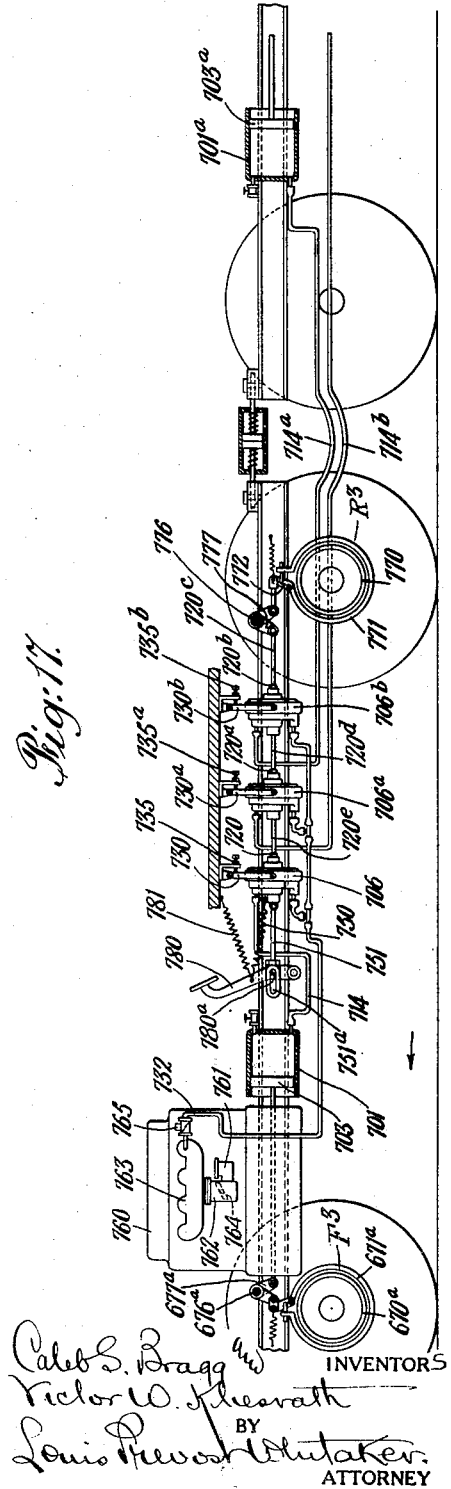

Patented Aug. 22, 1933

1,923,186

UNITED STATES PATENT OFFICE 1,923,186

BRAKE SYSTEM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a Corporation of New York Application June 6, 1928. Serial No. 283,182

10 Claims. (Cl. 188—152)

Our invention consists in the novel features hereinafter described, reference being had to the accompanying drawings which show several embodiments of our invention selected by us for purposes of illustration, and the said invention is fully disclosed in the following description and claims.

Our invention is an improved brake system for automotive vehicles in which the brakes are applied by a power actuator or actuators operated by differentials of fluid pressures and transmitting their power to brake mechanisms in any desired way as by mechanical connections, or otherwise, in which the power actuator, or actuators, is, or are, controlled by manually operated valve mechanism comprising relatively movable parts having portions of sufficient area exposed to differentials of fluid pressure corresponding with those to which the movable member, or members, of the power actuator, or actuators is, or are, exposed during a power stroke, or strokes, of the latter, to provide a reactionary force operative in a direction to return the valve mechanism to its normal position, the said valve mechanism being interposed between an operator operated part and a part either rigidly connected with the vehicle or having limited movement with respect to the vehicle, (and referred to in the claims as a part fixed to the vehicle), in such manner that the said reactionary force will be applied to the operator operated part in a direction to resist the movement thereof, to operate the valve mechanism so as to effect a power stroke of the actuator, or actuators, and a yielding resistance, as a spring, being interposed between one of the relatively movable parts of the valve mechanism and the said part connected with the vehicle or the operator operated part, as preferred, the construction being such that the tension of said spring will be increased by such movement of the operator operated part and applied to the valve mechanism in a direction opposed to that in which the differential of fluid pressures on the valve mechanism operates upon the part to which the spring is connected. As the result of this construction, when the operator operated part is moved a predetermined distance and held in this position, a power stroke of the actuator, or actuators, will be initiated and continue until the differential of fluid pressures upon the movable parts of the actuators and the corresponding differential of fluid pressures on the valve mechanism are built up to a point where the latter exceeds the tension of the spring sufficiently to move the valve mechanism to its neutral or closed position, maintaining said corresponding differential of fluid pressures within the actuator, and holding the brakes connected therewith as applied, and simultaneously the differential of fluid pressures upon the valve mechanism will be applied to the operator operated part and be felt by the operator as an increased resistance proportionate to the power which the actuator, or actuators, exert on the brake mechanism. If the operator operated part is held in this position, any increase or decrease in the differential of fluid pressures, acting upon the movable portions of the actuators and in like manner on the valve mechanism, will permit the spring to effect a relative movement of the parts of the valve mechanism in a direction to decrease or increase the differential of fluid pressures, thus automatically maintaining the differential of fluid pressure constant so long as the operator operated part is held in that position. A further forward movement of the operator operated part will necessitate a further increase in the tension of the spring, resulting in a relative movement of the parts of the controlling valve mechanism to increase the differential of fluid pressures, applying further power to the brake mechanism and increased reactionary resistance to the operator operated part, until the tension of the spring is again exceeded by the differential of fluid pressures on the opposite faces of a part of the valve mechanism connected with said spring, and this operation may be continued until the operator operated part has moved the valve mechanism forward sufficiently to increase the tension of the spring beyond a point where it can be exceeded by the maximum differential of fluid pressures on opposite faces of the part of the valve mechanism connected therewith, at which time the valve mechanism will be in its fully open position to apply the full or maximum power to the actuator or actuators to fully apply the brake mechanism connected therewith.

While not limited thereto, our invention is particularly applicable to vacuum brake mechanism in which the power actuator, or actuators, is, or are, operated by differentials of fluid pressures provided by the rarification in the throttle controlled suction passage of an internal combustion engine employed for propelling the vehicle, or vehicles, (as for example a tractor and trailer) as the lower fluid pressure and atmospheric pressure, as the higher fluid pressure. Our invention is also applicable to brake systems in which the power actuators have their pistons normally submerged in the higher fluid or atmosphere, and in which the actuators have their pistons submerged in vacuum or lower fluid pressure, when the pistons are in released or retracted position.

In the accompanying drawings in which we have illustrated several embodiments of our invention, Fig. 1 represents a diagrammatic view of a brake system installed in an automotive vehicle and embodying our invention, the actuator being of the type in which the piston is submerged on the higher fluid pressure when in the released position.

Fig. 5 is an enlarged elevation of the valve mechanism and operator operated part as shown in Fig. 1.

Fig. 6 is a transverse sectional view on the dotted line 6—6 of Fig. 5.

Fig. 7 represents a modification of our invention in which a different form of operator operated part is shown and is connected to the valve mechanism through the variable tension spring.

Fig. 8 is a diagrammatic view similar to Fig. 1 showing a slightly modified embodiment of our invention in which the actuator cylinder is of the type in which the piston is submerged in vacuum when in the released position.

Fig. 9 is a similar diagrammatic view illustrating another embodiment of our invention in which the actuator and its controlling valve mechanism are located upon a trailing vehicle, the operator operated part being located on the main or tractor vehicle.

Figs. 10, 11 and 12 are enlarged sectional views similar to Figs. 2, 3 and 4, illustrating a form of valve mechanism adapted for the control of an actuator in which the piston is submerged in vacuum in the released position.

Fig. 13 is a diagrammatic view showing another embodiment of our invention in which the actuator is operatively connected with the brake mechanisms for steering and non-steering wheels, and means are provided for enabling the power of the operator to be applied to the non-steering wheels only.

Fig. 14 is a detail view illustrating a portion of the operator operated part and the means for enabling the operator to apply his physical force to certain of the brake mechanisms shown in Fig. 13.

Fig. 15 is a view similar to Fig. 13 showing a further modification of our invention.

Fig. 16 is a diagrammatic view of a brake installation for tractor and trailer, showing a slight modification of our invention in which the valve mechanism is located in linkage between the operator operated part and certain of the brake mechanisms.

Fig. 17 is a view similar to Fig. 16, showing a modified arrangement in which a plurality of valve mechanisms for controlling independent power actuators are connected in linkage between the operator operated part and certain of the brake mechanisms.

Figure 1:
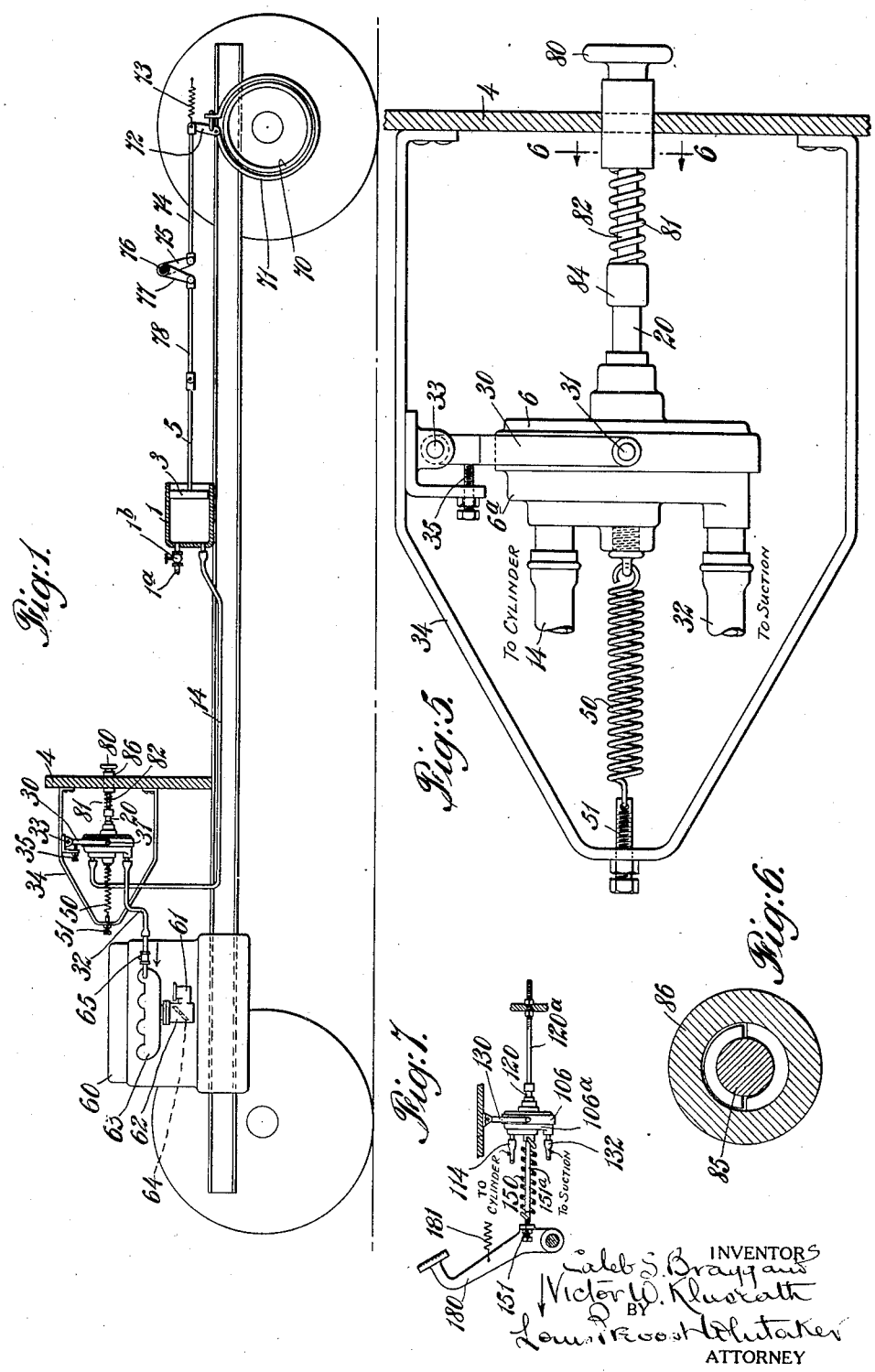

Referring to the embodiment of our invention illustrated in Figs. 1 to 6 inclusive, we have illustrated in Fig. 1 diagrammatically an automotive vehicle provided with an internal combustion engine, 60, for propelling it, having the usual carburetor, 61, a suction passage comprising a vertical portion, 62, and intake manifold, 63, the suction passage being provided with the usual throttle valve, 64. The vehicle is also shown provided with brake mechanism, in this instance applied to the rear or non-steering wheels, and which may be of any desired character. One of such brake mechanisms is shown as comprising in this instance the brake drum, 70, brake band, 71, brake applying lever, 72, and retracting spring, 73. The power actuator for applying the brake mechanisms comprises in this instance a cylinder, 1, closed at one end and open at the other end, and having a piston, 3, the piston rod, 5, of which is connected by a link, 78, with an arm, 77, on a transverse rock shaft, 76, indicated in section in Fig. 1, and provided with arms, 75, one of which is shown in the said figure, which are connected by a rod, 74, one of which is shown with the brake lever, 72, of the respective rear wheel brake mechanisms, it being understood that a power stroke of the piston, 3, will apply the brake mechanisms for the non-steering wheels with a predetermined maximum force determined by the leverages in the connections between the pistons and the brake mechanisms.

In this instance the controlling valve mechanism for the actuator is located forward of the dash or instrument board, represented at 4. This valve mechanism which is shown in released position in Fig. 2, comprises a hollow casing preferably formed of two members, 6 and 6a, threaded one upon the other, and provided with annular clamping portions, 7 and 7a. The casing member, 6a, is provided interiorly with an annular seat, 11, dividing the interior into an annular suction chamber, 12, and a central chamber, 13, said seat adapted to be engaged by a diaphragm, 8, having its marginal portions in sealing engagement with the valve casing and preferably clamped between the annular clamping portions, 7 and 7a. The diaphragm, 8, is provided with apertures, 19, which are at all times in communication with the atmosphere through apertures, 18, in the casing member, 6. Within the valve casing is a cup-shaped disc valve, 10, having an annular flange, or seat, 10a, for engaging the diaphragm upon its inner face to make an air tight connection therewith. The disc valve and the diaphragm are rigidly connected with a valve actuating part, 20, movable through a central aperture in the casing member, 6. The casing member, 6a, is provided with an aperture, 6b, communicating with the interior chamber, 13, and adapted to be connected with the cylinder, 1, of the power actuator, by a pipe, 14. The casing member, 6a, is also provided with an aperture, 6c, communicating with the annular suction chamber, 12, which is adapted to be connected by a suction pipe, 32, with the suction passage of the engine between the throttle valve, 62, and the engine cylinders, being in this instance connected with the intake manifold, 63, and provided preferably with a check valve, 65, opening in the direction of the arrow adjacent thereto, in Fig. 1.

Figure 2:
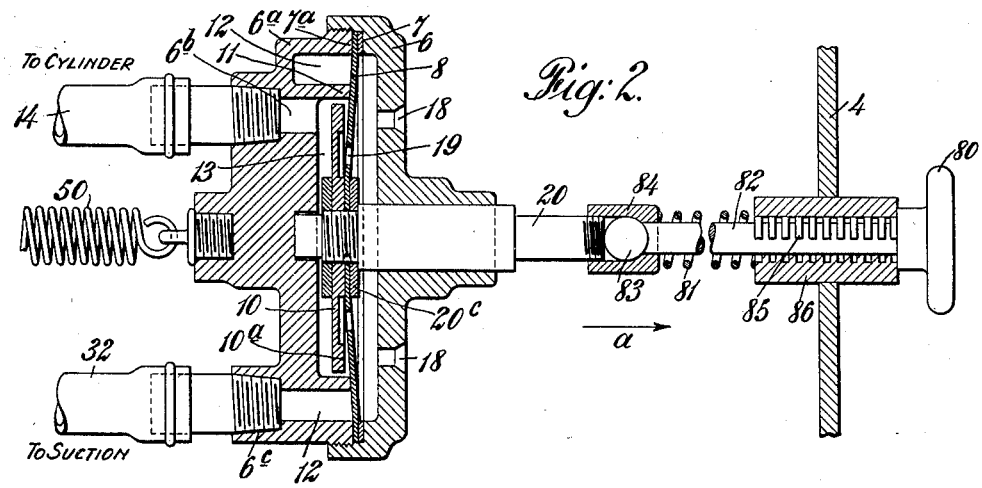
Fig. 2 is an enlarged sectional view of one form of controlling valve mechanism which we may employ in carrying out our invention and the operator operated part therefor, as shown in Fig. 1, the valve mechanism being shown in released position.

As shown in Figs. 1 and 2, the valve casing is movably supported forward of the dash, 4, by means of a yoke, 30, pivoted thereto at opposite sides, as indicated at 31, the yoke being pivoted at 33, in this instance to a supporting frame, 34, secured to the dash, 4, a suitable adjustable stop being provided for the valve casing in the off or released position, in this instance a set screw, 35. The valve casing, 6, 6$^a$, is connected with the supporting frame 34 through a yielding resistance member, in this instance a coiled spring, 50, which may be either of the expansion or compression type as preferred, but is here shown as an expansion spring. The forward end of the spring is connected with an adjusted device, in this instance a threaded adjusting screw, 51, carried by the frame 34 by means of which the tension of the spring may be adjusted. The valve actuating part, 20, is connected with an operator operated part constructed to move it and as will be explained hereafter, the valve casing in a direction away from the stop, 35, and against the normal tension of the spring, 50. The operator operated part may be of any desired type as a pull rod, hand lever, or foot lever, as preferred. In Figs. 1 and 2, we have shown the valve actuating part, 20, connected with the pull rod, 82, provided with a hand engaging part, 80. We prefer to provide means for locking the operator operated part in any position to which it may be moved, and such locking means may be of any desired character. In the present instance we have shown the pull rod, 82, connected with the valve actuating part by means which will permit the pull rod to be rotated, in this instance the rod, 82, being provided with a ball member, 83, engaging a socket, 84, which is screwed on to the end of the valve actuating part, 20, connecting the pull rod thereto, but permitting it to be rotated. The pull rod is also provided in this instance with a portion having a mutilated thread, as indicated at 85, which has a sliding engagement with the collar, 86, secured to the dash or instrument, 4, and having its interior provided with a similar mutilated thread. The mutilated threaded portions of the rod, 82, and the collar, 86, operate in a well known way, so that when the rod, 82, is rotated to disengage the threaded portions from each other, the rod may be freely moved through the collar, but by giving the rod, 83, a partial rotation in either direction, the threaded portions will be brought into engagement to secure the rod, 82, against longitudinal movement.

Figure 3:
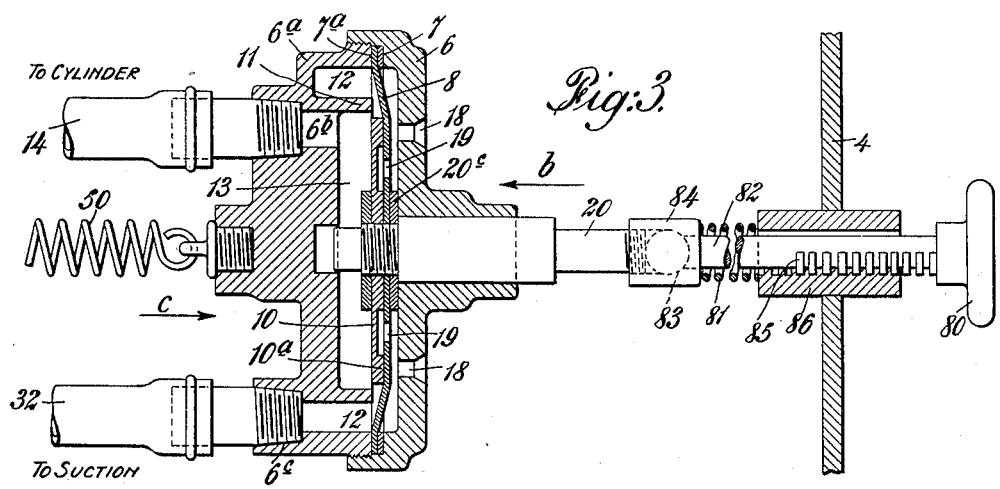
Fig. 3 is a view similar to Fig. 2 showing the parts in position to effect a power stroke of the connected actuator.
Figure 4:
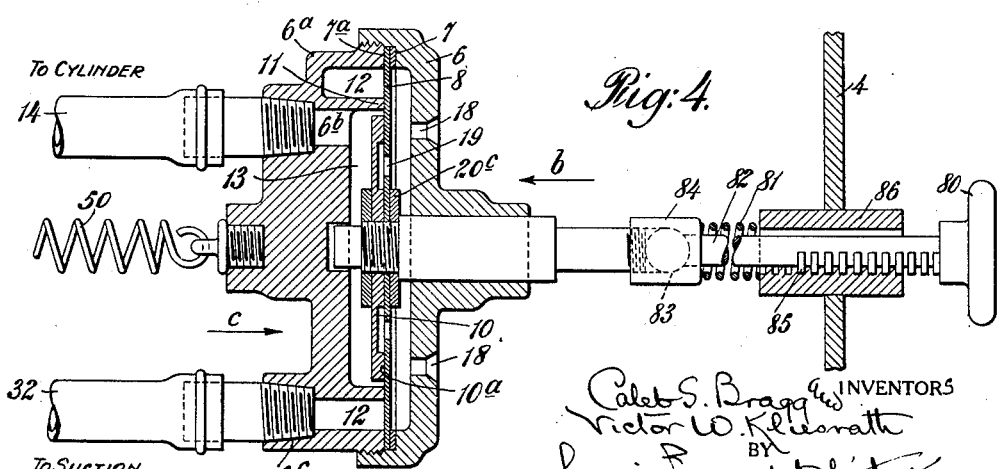
Fig. 4 is a similar view showing the neutral or closed position of the parts when the differential of fluid pressures on the valve mechanism counterbalances the tension of the spring.

We also provide means for limiting the relative movement between the valve actuating part, 20, and the valve casing, 6, 6$^a$. In this instance the valve actuating part, 20, is provided with a collar, indicated at 20$^c$, which will be brought into engagement with the casing member, 6, when the valve actuating part, 20, has been drawn out to its fullest extent, after which any further movement of the operator operated part and valve actuating part, 20, will draw the valve casing bodily in the same direction against the tension of spring, 50, and will necessarily increase the tension thereof, the normal or released positions of the parts of the valve mechanism and of the operator operated part are illustrated in Fig. 2. Assuming that the engine is running with the throttle valve closed or partly closed, rarification will be produced in the suction passage of the engine and the air will be exhausted from the suction pipe, 32, and from the annular suction chamber, 12, which in this position of the valve mechanism is disconnected from the central chamber, 13, owing to the fact that the diaphragm, 8, is in sealing contact with the annular seat, 11. The disc valve, 10, is out of contact with the diaphragm, so that the interior of the actuator cylinder, 1, the pipe, 14, the central chamber, 13, of the valve mechanism, and the interior of the valve casing on the opposite face of the diaphragm are in communication with the atmosphere through the apertures, 18 and 19. When the inner and outer faces of the casing member, 6, and the outer face of casing member, 6$^a$, and the inner face within the chamber, 13, are therefore exposed to atmospheric pressure fluid pressures thereon are substantially equalized. As the outer face of the piston, 3, is at all times exposed to atmospheric pressures, the piston is maintained submerged in atmosphere when the parts are in the released position, as will be readily understood. The central portion of the diaphragm corresponding with the area of the chamber, 13, is exposed to atmospheric pressure on both faces. The outer portions of the diaphragm corresponding with the area of the annular chamber, 12, are exposed on one face to suction in chamber, 12, and on the opposite face to atmospheric pressure, which tends to hold the diaphragm seated on the annular seat, 11. A retracting spring for the operator operated part, 82, and valve actuating part, 20, may be employed if desired, and we have shown a light spring, 81, in Figs. 1 to 5 for this purpose. This spring may, however, be omitted if desired. To effect a power stroke of the piston the operator will grasp the hand piece, 80, and draw the pull rod, 82, forward in the direction of the arrow, $a$, Fig. 2, where it may be held by hand or locked by giving a slight partial rotation to the hand piece, 80, sufficient to engage the mutilated threaded portions, 85, 86, as illustrated in Fig. 3. The first portion of this movement will bring the seat, 10$^a$, on the disc valve, 10, into sealing engagement with the diaphragm, 8, and close off communication between the cylinder and the air inlet apertures, 19, 18, and the further movement of the valve actuating part and operator operated part will unseat the diaphragm, 8, from the seat, 11, and may bring the collar, 20$^c$, into engagement with the valve casing, 6, drawing the entire valve casing forward against the resistance of the spring, 50, as shown in Fig. 3. As soon as the diaphragm, 8, is unseated, the chamber, 13, of the valve casing is placed in communication with the suction chamber, 12, and the exhaustion of air from the chamber, 13, and the actuator cylinder, 1, will immediately begin, and as it proceeds the reduction of pressure in the chamber, 13, will result in producing a differential of fluid pressures on opposite faces of the diaphragm, 8, and disc valve, 10, acting in the direction of the arrow, $b$, Fig. 3, which would be transmitted to the operator through the operator operated part if the latter were being held without being locked, and at the same time will result in a differential of fluid pressures on the opposite faces of the rear wall of the casing member, 6$^a$, acting in the direction of the arrow, $c$, in Fig. 3, and tending to push the valve casing bodily forward with respect to the diaphragm in opposition to the tension of the spring, 50. If the operator operated part has been drawn out to less than the extent of its entire operative movement, the tension of the spring, 50, will not have been increased beyond a point where the differential of fluid pressures acting upon the valve casing, 6, 6$^a$, may overcome the resistance of the spring, and as soon as such differentials of fluid pressures become sufficient to overcome the resistance of spring, 50, the valve casing will move bodily in the direction of the arrow, c, in Fig. 3, with respect to the operator operated part and valve actuating part and reseat the diaphragm, 8, upon the seat, 11, without necessarily unseating the disc valve, 10, from the diaphragm, as shown in Fig. 4, thus cutting off the cylinder, 1, from the suction pipe, 32, without placing it in communication with the atmosphere and holding the brake mechanism as applied, as the actuator piston, 3, will have been moved inwardly in a direction to apply the brake mechanism as soon as the evacuation of air from the cylinder, 1, began. The brakes, will, therefore, have been applied to a certain extent predetermined by the amount of rarification produced in chamber, 13, of the valve casing and in the cylinder, 1; which in turn is determined by the extent to which the operator operated part has been moved, and the tension of spring, 50, produced by such movement. If the operator operated part is not locked, the reactionary effect thereon of the differential of fluid pressures on opposite sides of the closed valve and diaphragm in the direction of arrow, b, and transmitted to the operator, would appraise him, by the increase in the resistance which he encounters, as to the extent to which the power of the actuator was being applied to the brake mechanism. If the operator desires to exert more power through the actuator upon the brake mechanism, he can draw out the operator operated part further, which will again unseat the diaphragm, 8, as indicated in Fig. 3, and effect a further evacuation of the cylinder until the differentials of fluid pressures on the valve casing again overcome the increased resistance of the spring, 50, and again move the valve casing forward into the position indicated in Fig. 4, and seat the diaphragm without unseating the disc valve therefrom. This operation will be repeated until the operator operated part has been drawn out far enough to increase the tension of spring, 50, to a point where the differential of fluid pressures will be unable to overcome the increased tension of the spring, 50. When the diaphragm will remain unseated the maximum rarification will be produced in the cylinder, 1, and the brake mechanism will be applied with the maximum power of the actuator.

Where the operator operated part has been drawn out to less than its maximum extent and the operator operated part is held or locked in that position, as indicated for example in Fig. 4, the brakes are held as applied to the desired extent, dependent upon the extent to which the operator operated part has been drawn out. If the rarification within the cylinder, 1, and chamber, 13, of the valve mechanism becomes less as by leakage past the piston, 3, of the actuator for example, the resulting rise in pressure within the chamber, 13, will lower the differential of fluid pressures acting upon the diaphragm in the direction of the arrow, b, and upon the valve casing in the direction of the arrow, c, which will permit the spring, 50, to move the valve casing rearwardly with respect to the diaphragm, unseating the diaphragm, reconnecting the cylinder with the suction pipe, 32, and exhausting a sufficient quantity of air from the cylinder to again restore equilibrium between said differentials of fluid pressures and the tension of the spring, 50. If air is withdrawn from the cylinder by reason of a leak in the valve mechanism for example, the increased differential of pressures on the opposite faces of valve casing, 6ª, will move the valve casing in the direction of the arrow, a, Fig. 2, opening the atmospheric valve to reduce the rarification within the valve mechanism and cylinder. It follows, therefore, from this arrangement that when the brakes are thus held as applied, the degree of rarification within the cylinder, 1, of the acuator, and the power exerted by the actuator upon the brake mechanism will be automatically maintained constant.

When the brakes are applied to the desired extent by the operator and it is desired to release them, the operator will release the operator operated part if it has been locked and allow it to be drawn in the direction of the arrow, b, Fig. 4, by the differential of pressures on opposite faces of the closed valve, 10, and the diaphragm, or by the influence of the retracting spring, 81, or both, thereby unseating the disc valve, 10, from the inner face of the diaphragm, and admitting atmospheric air through the apertures, 18, 19, to the chamber, 13, of the valve casing and to the cylinder, 1, of the actuator, which will equalize pressures on the opposite faces of the piston, 3, of the actuator, and permit the brake mechanism to release itself and be restored to retracted position under the influence of its retracting means, as the spring or springs, 73. As the degree of rarification is reduced within the cylinder and within the chamber, 13, the differential of pressures on opposite faces of the valve casing, 6ª, are reduced and the tension of the spring, 50, will cause the valve casing to move in a direction towards its stop, 35. If a partial release of the brakes is desired, the operator will hold or lock the lever, 80, and the valve casing will move in the direction of the stop, 35, under the tension of the spring, 50, until the valve, 10, seats upon the diaphragm, disconnecting the cylinder from the atmosphere and holding the degree of rarification existing in the cylinder at that time, as previously described.

While we have described the operation of the valve mechanism as controlling a single power actuator, it is to be understood that a single valve mechanism may control as many power actuators as desired, by properly connecting them with the valve mechanism, or the pipe, 14, therefrom, and in Fig. 1 we have shown the cylinder, 1, provided at its closed end with a pipe, 1ª, by which said cylinder may be connected to the corresponding portions of another actuator cylinder, or cylinders, the pipe, 1ª, being shown provided with a cut-off valve, 1ᵇ, for closing it when not in use.

In Figs. 1 to 5 inclusive we have shown the operator operated part connected to the valve actuating part and the valve casing connected to a part fixed to the vehicle, but it is to be understood that these connections may be reversed if desired, and the operator operated part directly connected with the resistance spring while the valve actuating part is connected to a part fixed to the vehicle, or to a part connected to the vehicle and having a limited amount of movement not sufficiently great to interfere with the operative movement of the foot pedal and considerably less than the movement of said pedal, as for example the arm or lever for applying certain of the brake mechanisms of the vehicle, in which case the foot lever may be provided with a positive connection between it and the valve casing, containing a provision for lost motion to enable the operator to apply his physical force to such brake mechanisms after the valve mechanism has been operated.

In Fig. 7 for example, we have illustrated a slight modification of the arrangement shown in Figs. 1 to 6, in which the corresponding parts are given the same reference numerals with the addition of 100. In this instance the operator operated part, indicated at 180, is a foot lever or pedal lever and is connected to one end of the resistance spring, 150, the other end of which is connected to the valve casing member, 106ª, the valve actuating part, 120, being connected by rod, 120ª, with a fixed part of the vehicle. The foot lever, 180, is provided with a separate retracting spring, 181, and a rod, 151ª, is provided within the coils of the spring, 150, between the foot lever and the valve casing, and loosely disposed with respect to one or both of said parts, so that when the foot lever is in released position and is retracted by the spring, 181, it will force the rod, 151ª, to the right in Fig. 7, and shift the valve mechanism into the released position illustrated in Fig. 2. The spring, 150, is provided with the usual calibrating means, indicated at 151. In this instance the connection of the rod, 120ª, with a fixed part of the vehicle performs the function of the stop, 35, in the preceding figures. In this construction, when the operator depresses the pedal and increases the tension of the spring, 150, sufficiently to overcome the friction and resistance of the parts of the valve mechanism, the valve casing will move with respect to the valve actuating part, 120, in the direction of the arrow, Fig. 7, and move the valve mechanism into the position illustrated in Fig. 3, to operate the power actuator, at the same time producing a resultant differential of fluid pressure on the opposite faces of the casing member, which will tend to move the valve casing in a direction opposite to that indicated by the arrow and reseat the diaphragm valve, where the forward movement of the operator's foot is stopped and the tension of the spring, 150, has not been increased to the maximum extent and beyond the power of a maximum differential of fluid pressures to overcome the same. When the operator releases the foot lever, permitting the differential of pressures on the casing members to move the valve casing in a direction opposite that indicated by the arrow in Fig. 7, and restore the parts of the valve mechanism to the position indicated in Fig. 2, the cylinder of the actuator is reconnected with the atmosphere to effect the release of the brake mechanisms, and the retracting spring, 181, for the pedal lever retracts said lever until it is arrested by the intervening rod, 151, the retracting spring, 181, holding the pedal lever and also the valve casing in the released position regardless of the initial tension on the spring, 150.

In Fig. 16 we have shown a slight modification of this arrangement embodied in a brake system for tractor and trailer vehicles, in which the valve mechanism indicated at 606, is mounted on the tractor vehicle and supported by the yoke, 630, which is provided with a stop, 635, the casing being connected with the foot lever, 680, by the resistance spring, 650, and the valve operating part, 620, being connected by a link, 620ª, with an arm, 677, on a rock shaft, 676, connected with brake mechanisms, one of which is indicated at R², for certain wheels of the tractor, constructed as hereinbefore described. The pedal lever, 680, is provided with a separate retracting spring, 681, as in Fig. 7, and a link, interposed between the pedal lever and the valve casing, is provided with a slot, 651ª, adapted to be engaged by a pin, 680ª, on the foot lever for example, to provide for a limited amount of lost motion between the foot lever and the valve casing. The pin, 680ª, is held in engagement with the rear end of the slot, 651ª, by the retracting spring, 681, in the released position of the parts, thus holding the valve casing in its rearward position in contact with the stop, 635, and maintaining the brake mechanisms, R², in the released position under the action of their retracting springs, 673. In this embodiment of our invention the actuator controlled by the valve mechanism is located on the trailer vehicle and comprises the cylinder, 601, and piston, 603, which is connected in the usual manner with brake mechanisms indicated at T², for the trailer wheels. It will be understood that the valve mechanism is constructed as previously described with reference to Figs. 1 to 6, and that the parts corresponding to those in Fig. 1 are given the same reference numerals with the addition of 600. The operation of the apparatus shown in Fig. 16 will be the same as that previously described with reference to Fig. 7, except that in this case the valve actuating part, 620, instead of being fixed with respect to the vehicle, has a limited amount of movement equal to that required to apply the brake mechanisms, R². Said valve actuating part will, however, be held against movement by the spring, 673, as the foot lever is depressed to increase the tension of the spring, 650, the spring, 673, having a greater tension than the resistance spring, 650. As a result of the depression of the foot lever, 680, the valve casing, 606, will be moved forward in the direction of the arrow Fig. 16, to shift the valve mechanism into the position indicated in Fig. 3 and effect the application of the brake mechanisms, T², by the power actuator. When these brake mechanisms have been applied to the full power of the actuator, the further forward movement of the pedal will bring the pin, 680ª, into engagement with the forward end of the slot, 651ª, thereby directly connecting the foot lever with the valve casing, and permitting the entire valve casing, together with the valve actuating part, 620, and link, 620ª, to be drawn forward in the direction of the arrow, Fig. 16, and apply the physical force of the operator to the brake mechanisms, R², in this instance located on the rear or driving wheels of the tractor vehicle. When the foot lever is released, the brake mechanisms, R², will be permitted to return to their released positions, and the relaxation of the resistance spring, 650, will permit the differential of fluid pressures on opposite faces of the casing members to shift the valve casing rearwardly with respect to the valve actuating part, 620, to connect the actuator cylinder with the atmosphere and permit the release of the brake mechanisms, T², the retracting spring, 681, for the foot lever insuring the return of the valve casing to its normal position, and the valve casing being arrested by the stop, 635, against which it is forced by the rod, 651, regardless of the initial tension of the spring, 650, as the pin, 680ª, engages the rear end of the slot, 651ª.

As before stated, our invention may be carried into effect in connection with a power actuator, or actuators, in which the piston is maintained submerged in vacuum when in the released position.

In Fig. 8 we have shown a diagrammatic view similar to Fig. 1, illustrating an embodiment of our invention in which the actuator is of this type, and in Figs. 10, 11 and 12, we have shown a slightly modified form of valve mechanism in three positions, which may be conveniently employed in connection with this type of actuator. In these figures the parts corresponding with those in Figs. 1 to 6 inclusive will be given the same reference characters with the addition of 200 to avoid repetition. In Fig. 8, 201 indicates the actuator cylinder which is closed at both ends and provided with a piston, 203, operatively connected with the brake mechanism. The specific form of valve mechanism shown in Figs. 10, 11 and 12 forms no part of the present invention and it will be described only so far as it is necessary to enable our present invention to be understood. In this instance the valve casing, 206, 206ª, is constructed in a manner similar to the valve casing previously described, and is provided with a diaphragm, 208, adapted to seat on an interior annular valve seat, 211. The diaphragm is secured by air tight connections to a hollow valve actuating part, 220, extending in this instance through an aperture in the casing member, 206ª, which is provided with a sealing member, 221. The valve actuating part also carries within the chamber, 213, a disc valve, 210, provided with an annular flange, 210ª, adapted to sealingly engage a seat upon the diaphragm, and form a chamber, 210ᵇ, between the disc valve and diaphragm, which is at all times in communication with the atmosphere by means of an aperture, 218, in the hollow valve stem or actuating part, 220, within the chamber, 210ᵇ, and an air inlet aperture, 218, communicating with the atmosphere outside of the valve casing. The annular suction chamber, 212, outside of the central chamber, 213, is connected by a pipe, 232, with the suction passage of the engine as previously described, and the suction passage of the engine is at all times connected with the actuator cylinder forward of the piston, in this instance by a branch suction pipe, 232ª, Fig. 8. The rear end of the cylinder is connected by a pipe, 214, with the chamber, 213. In this instance the valve casing is connected by the resistance spring, 250, with a fixed part of the vehicle, said spring being provided with suitable adjusting or calibrating means, indicated at 251, and the valve actuating part, or stem, 220, is connected with the operator operated part, in this instance by a Bowden wire, 282, extending through a casing, 282ª, and connected with a hand operating lever, 280, provided with means for locking the same, consisting in this instance of a locking segment, 285, and locking pawl, 286, provided with the usual releasing lever, 287. The valve casing is shown supported by a yoke, 230, engaged in the released position by an adjustable stop, 235.

In this instance the valve casing is provided with a chamber, 206ᵈ, on the opposite side of the diaphragm from the disc valve, 210, which is at all times in communication with the suction chamber, 212, through apertures, 219, in the diaphragm. In order to facilitate the seating of the flange, 210ª, on the diaphragm, we conveniently provide an annular abutment, 206ᵇ, which is preferably provided with lateral passages, 206ᶜ, in order that all portions of the chamber, 206ᵈ, shall be in communication with the suction pipe, 232.

Assuming that the parts are in released position and the engine running with the throttle valve closed or partly closed, air will be exhausted from the front end of the cylinder of the actuator through the suction pipe, 232, and the branch pipe, 232ª, and air will also be exhausted from the suction chamber, 212, of the valve casing and from the chamber, 206ᵈ, on the opposite side of the diaphragm. The atmospheric pressure between the diaphragm and the disc valve acts upon said parts in opposite directions and is thus neutralized with respect to the valve actuating part, 220, and we prefer to employ a light spring, as indicated at 281, between the valve casing and the disc valve to hold the disc valve in sealing engagement with the diaphragm, pressing the diaphragm upon the abutment, 206ᵇ, and holding the diaphragm unseated. This position of the diaphragm and disc valve places the suction chamber, 212, in communication with the central chamber, 213, of the valve casing and in communication through the pipe, 214, with the cylinder of the actuator in rear of the piston, exhausting the air therefrom, and thus maintaining the piston of the actuator submerged in vacuum when the parts are in the released position. The spring, 250, holds the valve casing in its retracted position against the stop, 235. In this position of the valve mechanism the inner faces of both casing members are exposed to suction and the outer faces to atmospheric pressure, so that the differential of fluid pressures on the opposite faces of the casing members, 206 and 206ª, act in opposite directions and neutralize each other.

To effect a power stroke of the actuator piston the operator will draw the hand lever, 280, rearwardly, thereby moving the hollow valve stem forwardly in the direction of the arrow, e, in Fig. 10. This will move the diaphragm, 208, into sealing engagement with the seat, 211, and disconnect the actuator cylinder in rear of the piston from the suction pipe, 232, and thereafter move the disc valve, 210, out of engagement with the diaphragm and connect the cylinder in rear of the piston with the atmosphere through the hollow valve stem and air inlet, 218, admitting air to the actuator cylinder to effect a movement of the piston therein to apply the brakes, and at the same time may bring the disc valve, 210, into engagement with the casing member, 206ª, moving the entire valve casing forward in the direction of the arrow, e, against the resistance of the spring, 250, the tension of which is somewhat increased, as indicated in Fig. 11. As the pressure in the rear portion of the actuator cylinder and within the valve casing between the disc valve and the diaphragm is built up toward atmospheric pressure, the differential of fluid pressures on the outer face of the casing member, 206ª, and upon its inner face (and upon the inner face of the disc valve if in contact therewith) will gradually decrease, while the differential of fluid pressures on the opposite faces of casing member, 206, will remain as before, the inner face being still exposed to suction, and the outer face being exposed to atmospheric pressure. The differential of fluid pressures on the opposite faces of the casing member, 206, exerted in the direction of the arrow, f, Fig. 11, will therefore no longer be equalized by a corresponding differential of fluid pressures on the opposite faces of the casing member, 206ª, exerted in the opposite direction, and will tend to move the entire valve casing in the direction of the arrow, f, overcoming the resistance of the spring, 250, as soon as the differential of fluid pressures on the opposite faces of the casing member, 206ª, has been sufficiently reduced to permit this action to take place.

This will bring the parts into the position shown in Fig. 12, and reseat the flange portions, 210ᵃ, of the disc valve, 210, in sealing engagement with the diaphragm without, however, unseating the diaphragm from the annular seat, 211.

It will also be understood that when the valve mechanism is moved into the position shown in Fig. 11, and the pressure builds up in chamber, 213, it will gradually reduce the differential of fluid pressures on opposite faces of the disc valve, 210, while the differential of fluid pressures on the diaphragm remains the same and is gradually transferred to the operator operated part as the equalizing differential of fluid pressures on the disc valve decreases, thus adding to the initial resistance of the retracting spring, 281, in substantial proportion to the differential of fluid pressures in the actuator cylinder. If the operator operated device is being held by the operator and has not been locked, this increased resistance would be transmitted to the operator and would enable him to determine accurately the extent to which the power of the actuator piston is being held applied to the brake mechanism.

It will be understood that in this form of valve mechanism and actuator also, where the brakes are held applied by the operator at less than its maximum power, should the pressure in rear of the piston decrease due to leakage or otherwise, the differential of fluid pressures on the valve casing exerted in the direction of the arrow, f, would no longer overcome the spring, 250, the valve casing would be drawn rearwardly, shifting the valve mechanism into the position indicated in Fig. 11, and additional air would be admitted to the actuator cylinder in rear of the piston, thus automatically maintaining the brakes applied at the pressure determined by the position to which the operator operated part has been moved. If pressures increase within the cylinder to the rear of the piston, as by air leaking in, the valve casing will move forwardly reconnecting the cylinder with the source of suction to reduce pressures. In like manner as hereinbefore stated, if the operator operated part is moved far enough to increase the tension of the spring to a point where it cannot be counterbalanced by the differential of the fluid pressures on the valve casing, the connection between the rear end of the cylinder of the actuator and the atmosphere will remain open and the brakes will be applied with the maximum power of the actuator.

To release the brake mechanism the operator will release the hand lever, permitting the valve actuating part to be returned by the spring, 281, to its released position, indicated in Fig. 10, closing off the atmosphere from the rear end of the actuator cylinder, and again connecting it with suction to withdraw the air previously admitted for the power stroke, and equalizing pressures on opposite faces of the actuator piston, permitting the brake mechanism to relieve itself and be retracted to its released position by its retracting means, as the springs, 273. The valve casing will be returned by the tension of spring, 250, as the differential of pressures on its opposite faces are equalized and will be arrested by the stop, 235.

It will be understood that a single valve mechanism may be employed for controlling a plurality of actuators, and by way of example we have shown in Fig. 8 the opposite ends of cylinder, 201, provided by pipes, 201ᵃ and 201ᵇ, for connecting that with the corresponding portions of another actuator cylinder, or actuator cylinders, said pipes being shown provided with cut-off cocks, 201ᶜ and 201ᵈ, for closing them when not in use.

It will also be understood that it is immaterial whether the valve mechanism and the power actuator are located on the same vehicle, in the case of connected vehicles as tractor and trailer, and it is also immaterial as to whether the valve mechanism is located adjacent to or at a distance from the operator operated part. For example we have illustrated diagrammatically in Fig. 9 a slightly modified embodiment of our invention in which is shown a brake system for tractor and trailer similar to that illustrated in Fig. 8, the corresponding parts to those in Figs. 1 to 6 inclusive being given the same reference numerals with the addition of 300, to avoid repetition. In this instance we have shown a tractor vehicle, A, provided with the internal combustion engine for propelling it, and a trailing vehicle, B, suitably connected with the tractor. In this instance the tractor vehicle may be provided with brake mechanism of any desired character not shown, and the trailing vehicle, B, is shown provided with a power actuator, the cylinder of which is indicated at 301, mounted on the trailer and connected with brake mechanism therefor, valve mechanism of the kind just described with reference to Figs. 8, 10, 11 and 12, being shown on the trailer adjacent to the power actuator, and being connected by the Bowden wire, 382, with an operator operated hand lever, 380, mounted on the tractor, the Bowden wire and its casing, 382ᵃ, being so constructed as to provide the necessary slack for accommodating relative movements of the vehicles.

Figs. 13 and 14 represent another embodiment of our invention shown diagrammatically in connection with an automotive vehicle having brake mechanisms for steering and non-steering wheels, all of which may be applied by the power of the actuator, means being provided whereby the operator may add his physical force to certain brake mechanisms less than the whole number operated by the actuator, and preferably to the non-steering wheel brake mechanisms when desired, in addition to the power of the actuator for operating said brake mechanisms in case of failure of power. In this figure the parts corresponding with those illustrated in Fig. 1 are given the same reference characters with the addition of 400. In this figure, F represents one of the front or steering wheels of the vehicle, and R represents one of the rear or non-steering wheels, it being understood that each wheel of the vehicle is provided with independently operable brake mechanism, which may be of any desired type, but in this instance is shown as being of the same type as that illustrated in Fig. 1, and previously described, the rear wheel brake mechanisms being operated simultaneously by means of a rock shaft, 476, provided with an actuating arm, 477, and the front wheel brake mechanisms being simultaneously actuated through a rock shaft, 476ᵃ, connected therewith and provided with an actuating arm, 477ᵃ. In this instance the actuator cylinder, 401, is movable lengthwise with respect to the vehicle, and as shown is suspended by pivoted arms, 401ᵃ. The cylinder is closed at both ends and provided with the piston, 403, which is connected by a link, 478, with the operating arm, 477, for the rear wheel brake mechanisms. The cylinder, 401, is in this instance connected by a link rod, 478ᵃ, with the operating arm, 477ᵃ, for the front or steering wheel brake mechanisms. The valve mechanism is of the same kind as previously described with reference to Figs. 8 to 12 inclusive, and in this instance the valve actuating part, 420, is connected by a link, 482, with a foot lever, 480, pivotally mounted on a shaft, 480ª, secured to the chassis. In conjunction with the foot lever, 480, we provide means including a provision for lost motion whereby the physical force of the operator may be applied to certain brake mechanisms less than the whole number, and preferably to the brake mechanisms for the non-steering wheels. In Fig. 13 for example we have shown an arm, 490, pivotally mounted on the shaft, 480ª, and movable independently of the foot lever and connected with the link rod, 478, extending to the brake mechanisms for the non-steering wheels. Connected with the arm, 490, is a second arm, 491, forming therewith a bell crank lever, the arm, 491, being provided with a laterally extending projection, 492, lying forward of the foot lever, a sufficient amount of lost motion being provided between the foot lever and the projection, 492, to permit the valve mechanism to be operated to initiate a power stroke of the piston. The controlling valve mechanism for the actuator operates in the manner previously described with reference to Figs. 8 to 12. When the pedal is depressed by the operator, atmospheric air is admitted to the cylinder in rear of the piston, and the piston moves forwardly while the cylinder of the actuator moves rearwardly, thereby simultaneously applying all of the brake mechanisms by power to a certain definite extent determined by the extent of movement of the pedal lever, and the brakes will be held as applied as soon as the differential of fluid pressures on the valve casing is sufficient to overcome the resistance spring, 450. Obviously the application of the rear wheel brake mechanisms, by the actuator piston, will carry the arm, 491, and projection, 492, forward, and keep it ahead of the pedal lever, 480, but the position of the pedal lever regulates the pressure applied to the brake mechanisms by the actuator, in the manner previously described regardless of the range of movement of the arm, 491. If the pedal lever is again moved forward, additional power will be applied to all of the brake mechanisms by the actuator as previously explained, and this continues until the forward movement of the pedal lever has increased the resistance of spring, 450, beyond the differential of fluid pressures on the valve casing, when the full power of the actuator will be applied to all of the brake mechanisms. When this has been accomplished the operator, by further depressing the pedal lever, 480, against the tension of the spring, 450, until the pedal lever is brought into contact with the lateral projection, 492, may apply his physical force to the arm, 491, which will be transmitted through the arm, 490, and link rod, 478, to the brake mechanisms for the rear or non-steering wheels only, thus adding his physical force to that of the actuator as through the non-steering wheel brake mechanisms only. It will also be seen in case of failure of power the operator can, by depressing the foot lever until it comes in contact with the projection, 492, operate the valve mechanism so as to vent the cylinder of the actuator and apply the non-steering wheel brake mechanisms by physical force alone. It will be noted that in Fig. 13, the arm, 491, is shown as being of greater length from its pivotal connection to the projection, 492, than the arm, 490, thus multiplying the physical force of the operator in its application to the non-steering wheel brake mechanisms. It is also obvious that by calibrating the spring, 450, by adjusting the screw, 451, or other calibrating means, so that its resistance may be overcome by the differential of fluid pressures on the valve casing throughout the full power stroke of the actuator, the effective force exerted by the actuator on the brake mechanism may be limited, as desired, so that it will be necessary or desirable for the operator to add his physical force at each application of the brakes to a greater or less extent. It will be understood that in the operation of the valve mechanism as previously described, the differential of fluid pressures on the diaphragm will produce a reactionary effect on the pedal lever which is communicated to the foot of the operator, as previously described, and in all the embodiments of our invention the resistance of the spring connected with the valve mechanism will also be added to this reactionary force.

In Fig. 15 we have shown another modification of our invention in which the parts corresponding with those shown in Figs. 1 to 6 are given the same reference characters with the addition of 500 to avoid unnecessary repetition. In this figure which represents diagrammatically an automotive vehicle having steering wheels, F¹, and non-steering wheels, R¹, provided with independently operable brake mechanisms as previously described with reference to Fig. 13, the actuator which is of the type shown in Figs. 8, 9 and 13, comprises a cylinder, 501, which is in this instance mounted stationarily with respect to the vehicle, and provided with a movable piston, 503, the piston rod, 505, of which is connected by a link, 578ª, with the actuating arm, 577ª, for operating the steering wheel brake mechanisms, and is also connected with one end of a two armed lever, 590, the other end of which is connected by a link rod, 578, with an actuating arm, 577, for the rear wheel brake mechanisms. The two armed lever, 590, is pivotally mounted at 580ª, and is provided with a rigid arm, 591, having a laterally extending projection, 592, extending forwardly of the pedal lever, indicated at 580, and connected by link, 582, with the valve actuating part, 520, of valve mechanism, such as is illustrated in Figs. 10, 11 and 12, and previously described. In this construction a forward movement of the pedal lever will operate the valve mechanism and effect a power stroke of the actuator piston as previously described, which will apply all of the brake mechanisms by power to the predetermined extent determined by the extent to which the pedal lever has been moved to increase the tension of the spring, 550. In this construction the operator can, after applying the brakes to the full extent of the power of the actuator, further depress the pedal lever into contact with the arm or projection, 592, connected with the two armed lever, 590, and apply his physical force to both the steering wheel brake mechanisms and non-steering wheel brake mechanisms if desired in addition to the power of the actuator, and in this construction he may place the valves in position for venting the actuator cylinder and apply all of the brake mechanisms by physical force alone.

We do not wish to be limited to the particular type of reactionary valve mechanism herein shown and described, as other forms of reactionary valve mechanism may be employed, such as those illustrated, in which the reactionary valve is counterbalanced by yielding resistance interposed between the valve and a portion of the casing.

It is also to be understood that where an automotive vehicle, for example, is provided with a plurality of power actuators which are to be controlled by a single operator operated part, we may employ a plurality of valve mechanisms constructed, arranged and operating in accordance with our present invention. This is advantageous in that a quicker and more nearly simultaneous operation of the several actuators is obtainable than could be obtained by the employment of a single valve mechanism operatively connected with a plurality of actuators.

In order to illustrate the last mentioned feature, we have shown in Fig. 17 an arrangement similar to that indicated in Fig. 16, for controlling a plurality of actuators by means of a plurality of independent valve mechanisms adapted to be simultaneously operated by a single operator operated part. The parts corresponding to those shown in Figs. 1 to 6 are given the same reference characters with the addition of 700. In Fig. 17 we have shown a tractor vehicle provided with brake mechanisms indicated at $F^3$, for the front wheels, operatively connected with a power actuator comprising a cylinder, 701, and piston, 703, the tractor vehicle being also provided with independent brake mechanisms, $R^3$. The trailer vehicle, a portion of which is shown in Fig. 17, is to be understood as being provided with independent brake mechanisms similar to those illustrated at $T^2$ in Fig. 16, and operatively connected with an auxiliary actuator comprising the cylinder, $701^a$, having a piston, $703^a$, therein. In this instance we have shown a tandem series of controlling valves, the casing of which are indicated at 706, $706^a$ and $706^b$, each supported by a yoke, and constructed for example as indicated in Fig. 2, and provided with the valve actuating parts, indicated at 720, $720^a$ and $720^b$, respectively. In this instance the part, $720^b$, of the rearmost valve mechanism is connected by a link, $720^c$, with operating means for the rear brake mechanisms, $R^3$, in the same manner as indicated in Fig. 16. The valve actuating part, $720^a$, is connected by a link, $720^d$, with the valve casing, $706^b$, and the valve actuating part, 720, is connected by a link, $720^e$, with the valve casing, $706^a$. The valve casing, 706, is connected by the yielding resistance spring, 750, with the foot lever, 780, which is provided with its independent retracting spring, 781, and the valve casing, 706, is also connected with the foot lever by the link rod, 751, provided with the slotted portion, $751^a$, for engaging the pin, $780^a$, on the foot lever, in the same manner as indicated in Fig. 16 and previously described. Each of the valve mechanisms has its suction chamber (indicated at 12 in Fig. 2) connected with the suction pipe, 732, leading to the intake manifold of the engine, and its central chamber (indicated at 13 in Fig. 2) connected with one (or more) of the power actuators by suitable tubular connections, indicatated at 714, $714^a$ and $714^b$, for example. In this instance the pipe, 714, is connected with the cylinder, 701, for operating the front wheel brake mechanisms of the tractor. The pipe, $714^a$, is connected with the actuator cylinder, $701^a$, on the trailer for operating the trailer brakes, and the pipe, $714^b$, is shown extending to the rear of the trailer and may be connected with another power actuator not shown, which may be located on the trailer, a portion of which is shown in this figure, or upon another trailer not shown, connected with the first mentioned trailer, if desired.

As the valve mechanisms are connected for joint operation between the operator operated part and a part connected with the tractor vehicle, in this instance a part for operating the rear wheel brake mechanisms, the valve actuating part of one valve mechanism being connected to the casing of the adjacent valve mechanism and so on in a tandem relation. It follows that when the operator depresses the foot pedal, 780, and increases the tension of the spring, 750, to a point sufficient to overcome friction and shift the several valve casings with respect to their valve actuating parts, each valve mechanism will be moved into the position shown in Fig. 3, for example, and each power actuator will be operated to apply the brake mechanisms connected therewith to the extent corresponding with the increased tension of the spring, 750, and if the forward movement of the foot lever is stopped without increasing the tension of the spring to its maximum, the resultant differential of fluid pressures on the casing member of each valve mechanism, when it becomes sufficient to overcome the increased tension of the spring, will cause said valve casings to react simultaneously with respect to their valve actuating parts to close off the communication between the respective power actuators and the suction passage and hold the brakes as applied in the manner previously described. If the operator moves the pedal forward sufficiently to apply the brakes to the maximum extent by the power actuators, he may, by a further movement which will bring the pin, $780^a$, against the forward end of the slot, $751^a$, apply his physical force to the brake mechanisms connected with the series of valves, in this instance the rear wheel brake mechanisms, $R^3$. The brake mechanisms will be released and the parts restored to their off or released positions in the same manner as previously described with reference particularly to Fig. 16.

It will be understood that the various embodiments of our invention herein shown and described are selected by us for purposes of illustration, and that variations thereof may be made in different installations to meet variations in conditions, within the scope of our invention.

We have explained before that the operator operated part may be connected directly with the resistance spring 50, 150, 250, 350, 450, 550, 650 or 750, while the valve actuating part is connected to a fixed part of the vehicle or to a part fixed to the vehicle but having a limited amount of movement and where we have used the expression "part fixed to the vehicle" we wish it understood that this part may be either stationary or have a slight movement with respect to the chassis, and the expression "part fixed to the vehicle" is synonymous for both forms.

What we claim and desire to secure by Letters Patent is:—

1. The combination with a power actuator having a part operated by a differential of higher and lower fluid pressures, of a controlling valve mechanism exterior to the actuator and movable with respect thereto, and means for connecting the actuator with sources of higher and lower fluid pressures under the control of said valve mechanism, said valve mechanism comprising a valve casing having opposite exterior faces perpendicular with its line of movement and exposed to the higher fluid pressure, and provided interiorly with valve means, the movement whereof to effect a power stroke of the actuator will be resisted by a differential of fluid pressures on said valve means corresponding substantially with the differential of fluid pressures in the actuator, valve operating means movable with respect to said valve casing, an operator operated part, connections from said valve casing and from said valve actuating part extending the one to a part fixed to the vehicle and the other to said operator operated part, and yielding means located in the connection to said casing, whereby the movement of the operator operated part to effect a power stroke of the actuator will move said casing and the valves with respect to said casing and will increase the tension, and the resultant differential of fluid pressures on said valve means and said faces of the casing will effect a relative movement of said casing and valve means to stop the power stroke of the actuator when said differential exceeds the increased tension of said yielding means.

2. The combination with a power actuator having a part operated by a differential of higher and lower fluid pressures, of a controlling valve mechanism exterior to the actuator and movable with respect thereto, and means for connecting the actuator with sources of higher and lower fluid pressures under the control of said valve mechanism, said valve mechanism comprising a valve casing having opposite faces perpendicular with its line of movement and exposed to the higher fluid pressure, and provided interiorly with valve means, the movement whereof to effect a power stroke of the actuator will be resisted by a differential of fluid pressures on said valve means corresponding substantially with the differential of fluid pressures in the actuator, valve operating means movable with respect to said valve casing, an operator operated part, connections from said valve casing and from said valve actuating part extending the one to a part fixed to the vehicle and the other to said operator operated part, and yielding means located in the connection to said casing, whereby the movement of the operator operated part to effect a power stroke of the actuator will move said casing and the valves with respect to said casing and will increase the tension, and the resultant differential of fluid pressures on said valve means and said faces of the casing will effect a relative movement of said casing and valve means to stop the power stroke of the actuator when said differential exceeds the increased tension of said yielding means, and means for limiting the relative movement between the valve actuating means and said valve casing, to permit the operator to increase the tension of said yielding resistance beyond the effective force of said differential of fluid pressures, to insure a maximum power stroke of the actuator.

3. The combination with a power actuator having a part operated by a differential of higher and lower fluid pressures, of a controlling valve mechanism exterior to the actuator and movable with respect thereto, and means for connecting the actuator with sources of higher and lower fluid pressures under the control of said valve mechanism, said valve mechanism comprising a valve casing having opposite exterior faces exposed to the higher fluid pressure, and provided interiorly with valve means, the movement whereof to effect a power stroke of the actuator will be resisted by a differential of fluid pressures on said valve means corresponding substantially with the differential of fluid pressures in the actuator, valve operating means movable with respect to said valve casing, an operator operated part, connections from said valve casing and from said valve actuating part extending the one to a part fixed to the vehicle and the other to said operator operated part, and yielding means located in the connection to said casing, whereby the movement of the operator operated part to effect a power stroke of the actuator will move said casing and the valves with respect to said casing and will increase the tension, and the resultant differential of fluid pressures on said valve means and said faces of the casing will effect a relative movement of said casing and valve, means to stop the power stroke of the actuator when said differential exceeds the increased tension of said yielding means, means for holding the operator operated part in predetermined adjusted position to effect a predetermined increase in the tension of said yielding resistance, whereby a decrease in said differential of fluid pressures will effect a relative movement of the valve casing and valves under the action of said yielding resistance to restore said differential of fluid pressures.

4. The combination with a power actuator having a part operated by a differential of higher and lower fluid pressures, of a controlling valve mechanism exterior to the actuator and movable with respect thereto, and means for connecting the actuator with sources of higher and lower fluid pressures under the control of said valve mechanism, said valve mechanism comprising a valve casing having opposite exterior faces exposed to the higher fluid pressure, and provided interiorly with valve means, the movement whereof to effect a power stroke of the actuator will be resisted by a differential of fluid pressures on said valve means corresponding substantially with the differential of fluid pressures in the actuator, valve operating means movable with respect to said valve casing, an operator operated part, connections from said valve casing and from said valve actuating part extending the one to a part having a limited amount of movement with respect to the vehicle, and the other to said operator operated part, a yielding resistance means located in said connection to the casing, the said casing and the part connected therewith being also connected by means providing lost motion, an independent retracting spring for said operator operated part, and means for limiting the relative movement between the casing and said valve actuating part.

5. In a vacuum brake system for automotive vehicles, the combination with a power actuator comprising a cylinder and a piston therein, means for connecting the actuator with brake mechanism of the vehicle, of controlling valve mechanism for the actuator comprising a valve casing located exteriorly with respect to the actuator and movable with respect thereto, said casing having opposite exterior faces, exposed to atmospheric pressure, a main valve within the casing and substantially parallel to said faces thereof, having its marginal portions in sealing engagement with the casing and dividing the casing into separate compartments, said casing having a main valve seat in one of said compartments for engaging the main valve and dividing said compartment into separate chambers when said valve is seated, means for connecting one of said chambers with the actuator between a closed end of the cylinder and the piston, means for connecting the other of said chambers with one of the fluid pressure sources, a disc valve in said casing provided with a seat for engaging the main valve, means for connecting the space between said main and disc valves with the other fluid pressure source, means for moving said valves with respect to the casing in the direction of movement of said casing, and operator operated part, connections from said valve casing and from said valve actuating means extending the one to brake mechanism of the vehicle and the other to said operator operated part, a yielding resistance means located in said connection to the casing, said casing and the part connected therewith being also connected by means providing a limited amount of lost motion, an independent retracting spring for said operator operated part, and means for limiting the relative movement between said casing and the valve operating means, whereby the operator after moving said operator operated part to increase the tension of the yielding resistance to the maximum extent, may apply his physical force to said brake mechanisms connected with said valve mechanism.

6. In a vacuum brake system for automotive vehicles, the combination with a plurality of power actuators each comprising a cylinder and piston, and means for connecting each piston with certain brake mechanism, of a plurality of valve mechanisms each comprising a valve casing, a main valve within the casing and dividing it into separate compartments, said casing having a main valve seat in one of said compartments dividing it into separate chambers, and a disc valve in said compartment having a seat for engaging the main valve, in a direction to disengage the main valve from the said main valve seat, and valve actuating means connected with said valves and movable with respect to the casing, means for connecting said chambers of each valve mechanism respectively with one of said actuators and with a source of suction, means for connecting said casing of each valve mechanism between the disc valve and the main valve, with a source of higher fluid pressure, a single operator operated part, operative connections from the casing and valve operating part of each valve mechanism respectively to said operator operated part, and to a part connected with the vehicle, a resistance spring interposed in the connections from said valve casings, a retracting spring for the operator operated part, and an independent connection from said operator operated part to the parts of said valve mechanisms connected therewith providing lost motion.

7. In a vacuum brake system for automotive vehicles, the combination with a plurality of power actuators each comprising a cylinder and piston, and means for connecting each piston with certain brake mechanism, of a plurality of valve mechanisms each comprising a valve casing, a main valve within the casing and dividing it into separate compartments, said casing having a main valve seat in one of said compartments dividing it into separate chambers, and a disc valve in said compartment having a seat for engaging the main valve, in a direction to disengage the main valve from the said main valve seat, and valve actuating means connected with said valves and movable with respect to the casing, means for connecting said chambers of each valve mechanism respectively with one of said actuators and with a source of suction, means for connecting said casing of each valve mechanism between the disc valve and the main valve, with a source of higher fluid pressure, a single operator operated part, operative connections from the casing and valve operating part of each valve mechanism respectively to said operator operated part, and to brake mechanism, a resistance spring interposed in the connections from said valve casings, a retracting spring for said operator operated part, and an independent connection from said operator operated part to the parts of said valve mechanism with which it is connected, providing a limited amount of lost motion, whereby when said operator operated part has been moved to effect the maximum operation of the power actuators controlled by said valve mechanisms, a further movement thereof will enable the operator to apply his physical force to the brake mechanisms connected with said valve mechanisms.

8. The combination with a power actuator and sources of higher and lower fluid pressure, of a bodily movable controlling valve mechanism provided with relatively movable parts subjected to said higher and lower pressures, said pressures acting on the valve mechanism in a direction tending to disconnect the higher pressure fluid from the actuator, means for connecting said valve mechanism to the actuator for controlling the fluid pressures thereto, an operator operated part, the relatively movable parts of the valve mechanism being the one connected to said operator operated part and the other to a part fixed to the vehicle, and means acting in opposition to the differentials of fluid pressure on the valve mechanism.

9. The combination with a power actuator and sources of higher and lower fluid pressure, of a bodily movable controlling valve mechanism provided with relatively movable parts subjected to said higher and lower pressures, said pressures acting on the valve mechanism in a direction tending to disconnect the higher pressure fluid from the actuator, means for connecting said valve mechanism to the actuator for controlling the fluid pressures thereto, an operator operated part, the relatively movable parts of the valve mechanism being the one connected to said operator operated part and the other to a part fixed to the vehicle, and means interposed in the connections and acting in opposition to the differentials of fluid pressure on the valve mechanism.

10. The combination with a power actuator and sources of higher and lower fluid pressure, of a bodily movable controlling valve mechanism provided with relatively movable parts subjected to said higher and lower pressures, said pressures acting on the valve mechanism in a direction tending to disconnect the higher pressure fluid from the actuator, means for connecting said valve mechanism to the actuator for controlling the fluid pressures thereto, an operator operated part, the relatively movable parts of the valve mechanism being the one connected to said operator operated part and the other to a part fixed to the vehicle, and resilient means interposed in the connections and acting in opposition to the differentials of fluid pressure on the valve mechanism.

CALEB S. BRAGG.
VICTOR W. KLIESRATH.